(12) United States Patent
Bohon et al.

(10) Patent No.: US 6,505,650 B2
(45) Date of Patent: Jan. 14, 2003

(54) METHOD FOR INHIBITING CORROSION UNDER INSULATION ON THE EXTERIOR OF A STRUCTURE

(75) Inventors: William M. Bohon, McKinney, TX (US); Gregory R. Ruschau, Delaware, OH (US)

(73) Assignee: Phillips Petroleum Company, Bartlesville, OK (US)

( * ) Notice: Subject to any disclaimer, the term of this patent is extended or adjusted under 35 U.S.C. 154(b) by 79 days.

(21) Appl. No.: 09/753,434

(22) Filed: Jan. 3, 2001

(65) Prior Publication Data

US 2002/0083993 A1 Jul. 4, 2002

(51) Int. Cl.[7] .................................................. F16L 9/14
(52) U.S. Cl. ....................................... 138/149; 138/146
(58) Field of Search ................................. 138/145, 146, 138/149; 106/83

(56) References Cited

U.S. PATENT DOCUMENTS

| | | | |
|---|---|---|---|
| 3,480,493 A | * 11/1969 | Bauer et al. | 138/149 |
| 3,665,968 A | 5/1972 | Warner | 138/141 |
| 3,677,303 A | * 7/1972 | Martin | 138/149 |
| 3,731,710 A | * 5/1973 | Bauer et al. | 138/149 |
| 3,973,056 A | * 8/1976 | Fessler et al. | 138/145 |
| 4,011,195 A | 3/1977 | Self | 260/40 R |
| 4,159,361 A | 6/1979 | Schupack et al. | |
| 4,162,093 A | 7/1979 | Sigmund | 285/47 |
| 4,225,678 A | 9/1980 | Roy | 521/117 |
| 4,255,527 A | 3/1981 | Roy | 512/117 |
| 4,397,338 A | * 8/1983 | Cunningham | 138/145 |
| 4,590,971 A | 5/1986 | Webster et al. | 138/149 |
| 4,759,917 A | 7/1988 | Coleman | 423/87 |
| 5,641,584 A | 6/1997 | Andersen et al. | 428/703 |
| 5,714,093 A | * 2/1998 | Heimann et al. | 252/389.62 |
| 5,834,075 A | 11/1998 | Miller | 428/34.6 |
| 6,273,144 B1 | * 8/2001 | Bohon et al. | 138/149 |

* cited by examiner

*Primary Examiner*—James Hook
(74) *Attorney, Agent, or Firm*—F. Lindsey Scott

(57) ABSTRACT

A method for inhibiting external corrosion on an insulated pipeline including a pipe insulation positioned outside and around the pipe and a coating material around the insulation by positioning a plurality of concentrated charges of alkaline material in the insulation material.

26 Claims, 4 Drawing Sheets

METHOD FOR INHIBITING CORROSION UNDER INSULATION ON THE EXTERIOR OF A STRUCTURE

FIELD OF THE INVENTION

This invention relates to a method for inhibiting corrosion under insulation on the exterior of a structure by positioning concentrated charges of alkaline material sufficient to raise the pH in water in the insulation to a value from about 8 to about 12. The method of the present invention is particularly effective with insulated pipelines to produce a corrosion inhibited pipeline. The method of the present invention is especially effective to inhibit corrosion in the existing pipeline installations.

BACKGROUND OF THE INVENTION

Corrosion under insulation can occur wherever piping, vessels, or tanks are thermally insulated and exposed to the weather. The problem begins when there is a breach in the outer jacketing protecting the insulation. Rain and melting snow can then penetrate the jacketing and wet the insulation. Liquid water will eventually contact the external surface of the pipe, vessel, or tank beneath the insulation. If the pipe, vessel, or tank is made of non-corrosion-resistant metal and no coating was applied to protect its exterior surface, (a common cost-savings measure), corrosion will occur. Depending on the amount of water present, availability of oxygen, and temperature of the metal surface, corrosion under insulation can be mildly aggressive: up to 60 mils per year (0.060 inches per year) wall loss has been observed. Often there are no visible signs that such corrosion is occurring; the first indication of corrosion under insulation is often failure of the pipe, vessel, or tank. Failures due to corrosion under insulation are usually sudden and catastrophic because the corrosion typically occurs over a sizeable surface area. This is in contrast to internal corrosion which is usually highly localized (pit) and typically just results in a small leak. For this reason, external corrosion is a more serious safety and environmental problem than internal corrosion.

Corrosion under insulation is a significant problem in the oilfields on the North Slope of Alaska, due to the advanced ages of their infrastructures. These fields' production gathering systems consist of above-grade, thermally insulated, bare (no coating), carbon steel pipe and are thus susceptible to corrosion under insulation. Many hundreds of miles of such piping are in place.

The most commonly used insulation system in Alaskan oilfields is known as "spiral-wrap" insulation and is still the preferred insulation for new construction. This insulation consists of urethane foam insulation between the pipe and an outer metal sheathing of corrugated, galvanized steel. The corrugations are in a spiral pattern. This insulation system is applied in a factory (shop-applied). Bare, carbon-steel pipe (usually a 40-ft joint) is first blasted with grit and cleaned with a solvent. The bare pipe is then placed inside a "tube" of corrugated galvanized steel, leaving an annulus between the pipe and the sheathing of either 2 or 3 inches depending on the pipe size. A two-part, liquid, polyurethane foam is injected between the sheathing and pipe where it expands, filling the annulus. The insulated pipe is then shipped to the field for use in constructing pipelines. The insulation may comprise foam insulation, closed cell foam insulation, fibrous insulation and the like.

In the field, the pre-insulated joints of pipe are welded together to form a pipeline. To allow for welding, a short length of pipe at either end of each pipe joint is left uninsulated by the insulation shop. Thus, when two pipe joints are joined, there is a gap in the shop-applied insulation at each field weld, (one gap about every 40 feet). Additional insulation is applied in the field to fill these gaps in the shop-applied insulation. Typically, a piece of flat, galvanized sheet steel wider than the insulation gap is wrapped around the pipe, bridging the gap in the shop-applied insulation (see FIG. 1). This forms a confined annular space. A two-part liquid polyurethane foam is injected into the annular space through an access hole in the sheet metal. The foam expands, filling the annular space, and making the pipe insulation continuous. The thin gap between the corrugated metal jacket of the shop-applied insulation and the sheet metal surrounding the field-applied insulation is sealed with a sealant (i.e. silicone caulk) to make the installation weatherproof. This field applied insulation is commonly referred to as a "weld pack".

Due to weathering of the sealant, thermal expansion of the pipe, and wind-induced vibrations, the seal between the field-applied jacketing and the shop-applied jacketing eventually fails. Blowing snow and/or rain then makes its way into the urethane foam insulation within. Although the insulation is closed-cell foam and will not absorb liquid water, it is permeable to water vapor. Water vapor successively penetrates cell walls and then condenses inside the cells. In this manner, water migrates through the insulation, eventually coming into contact with the bare, carbon-steel pipe inside. The process is very slow; it takes years for liquid water to migrate through the few inches of foam covering the pipe. Once the liquid water reaches the pipe, the water, oxygen, and heat (hot fluids inside the pipe) combine to form a corrosive environment.

Figure 1:
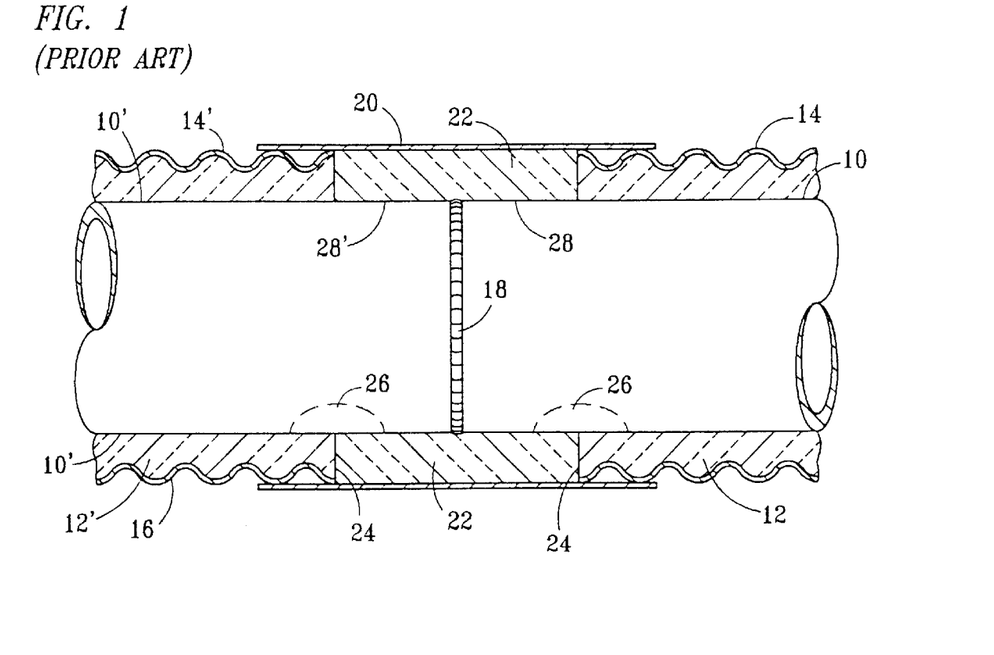
FIG. 1 is a description of a prior art weld pack showing the areas of most frequent corrosion.

When there is corrosion at a weld pack, often there are two patches of corrosion on either side of the girth weld along the bottom half of the pipe and centered around the joints between the shop-applied and field applied insulation (see FIG. 1). This is where the water usually first contacts the pipe.

Corrosion under insulation at weld packs has caused catastrophic failures of pipelines. When such failures occur before the corrosion is discovered and thus before measures can be taken to repair the damage the consequences of the failure can be explosive if the contents of the pipe are under pressure.

The failure of the seals at the weld packs, the progressive wetting of the insulation, and the resulting corrosion under insulation are all slow processes and produce no visible indications that they are occurring. Corrosion under insulation was not recognized until after the first failures occurred.

When corrosion is found, the wet insulation is removed, the corrosion product cleaned off the pipe, and the damage is measured and evaluated. If the damage is not too severe, the pipe is covered with a protective wrapping (such as a plastic tape designed for buried pipeline applications) and then reinsulated. If the damage is too severe, a reinforcing sleeve is installed over the damaged area before applying the protective wrap. Reconditioning weld packs is expensive.

This does not address the issue of wet weld packs which have not yet started to corrode. Even if additional water could be kept from entering the weld pack, the water already in the wet weld packs will continue to migrate through the insulation due to the gradient in water vapor pressure. When the water reaches the pipe surface, corrosion will begin. Because the foam is closed-cell, there is no known practical way of getting the water out of the insulation once there.

Drilling holes does no good as the water will not drain out as from a sponge. The only known way to eliminate the water is to remove the wet insulation itself, which is an expensive option as noted above.

Even though corrosion under insulation is a recognized problem, the spiral-wrap insulation with weld packs is still the preferred insulation system and has been used as recently as 1999–2000.

Past approaches to eliminating corrosion under insulation have typically focused on developing a better weld pack design that will remain weather proof. This approach has several drawbacks: The new designs are expensive, and the basic objective may be unobtainable considering the cyclic loading the weld packs are subjected to over their long operational lifetimes. Furthermore, this approach does nothing to address the problem of corrosion under insulation for existing construction.

In new construction, a simple way of eliminating corrosion under insulation is to coat (paint) the bare carbon steel pipe before it is insulated. This would protect the pipe when the weld packs eventually begin to leak. However, coating the pipe adds about 5% to the cost of constructing a new pipeline. Coating the pipe has been rejected several times in the past as too expensive. A means of mitigating corrosion under insulation which would add little to the cost of new construction is required.

Such a solution was found and is the subject of "Method for Inhibiting Corrosion in a Pipeline, filed Apr. 6, 2000 as U.S. Ser. No. 09/544,194 by William Mark Bohon and Gregory R. Ruschau. The solution was to add a solid, powdered, water-soluble corrosion inhibitor to the two-part, liquid, polyurethane foam during application of the insulation (both shop-applied and field-applied). If the foam becomes wet, the water dissolves the corrosion inhibitor as it migrates through the foam. When the water reaches the bare carbon steel pipe, it is no longer corrosive.

The corrosion inhibitor may be any one of a number of alkaline compounds such as tri-basic sodium phosphate (TBSP). When the inhibited foam becomes wet, the TBSP is leached from the foam matrix and the pH of the water is greatly increased. This doesn't actually stop the corrosion; rather, it slows the corrosion reaction by one to two orders of magnitude (a factor of 10 to 100) depending on the level by which the pH is increased. Thus, where previously corrosion under insulation might propagate to failure in about 5 years, with the alkaline corrosion inhibitor, an interval of 50 to 500 years may be required, eliminating corrosion under insulation as a practical concern. Laboratory tests show that once the pH is increased to about 9.5, the corrosion reaction slows so greatly as to be effectively halted.

The addition of the corrosion inhibitor to the foam does not affect the existing method of insulating pipe and construction pipelines, and only adds an estimated 1% to the cost of construction. This approach positively mitigates corrosion under insulation without having to rely on the integrity of a weld pack design and for considerably less than the cost of coating the pipe. However, this solution is applicable only to new construction; it does not address the problem of corrosion under insulation on existing pipelines.

In view of the many thousands of miles of existing pipelines which are vulnerable to corrosion under insulation a method for inhibiting corrosion under insulation in existing pipelines has been sought.

SUMMARY OF THE INVENTION

According to the present invention corrosion under insulation in existing pipelines is inhibited by inserting a concentrated charge of alkaline material into the insulation at a selected location, the alkaline material being at least partially soluble in water in the insulation to produce a pH from about 8 to about 12 in the water in the insulation.

Desirably, the concentrated charge is injected as a solid member, such as a spike, or as a gelatinous slug of alkaline material. The slug or spike is inserted through the exterior of the insulation or the covering over the exterior of the insulation into the insulation and if water is present, diffuses into the water to increase the pH of the water to a value of about 8 to about 12 and preferably to at least about 9.5. Buffers can be used with the alkaline material to produce the desired pH at a wide range of concentrations.

The present invention further comprises a method for inhibiting corrosion in a weld pack at the junction of two pipe sections, each of the pipe sections being coated with insulation, the insulation positioned around the pipe sections and between an outside of the pipe and an inside of a cover positioned over an outside of the insulation with end portions of the pipe being uninsulated and welded together to join the two pipe sections; the method comprising a) positioning a plurality of concentrated charges containing an alkaline material at least partially soluble in water in the insulation to produce a pH from about 8 to about 12 in water in the insulation around the pipe, b) covering the end portions of the pipe with a jacketing and positioning a field installed insulation inside the jacketing to fill the space between ends of the insulation, and between the outside of the end portions of the pipe and an inside of the jacketing.

The present invention further comprises a corrosion inhibited pipeline comprising:

a) a pipeline;

b) insulation positioned around at least a major portion of the pipeline; and c) a plurality of concentrated charges of an alkaline material which is at least partially soluble in water in the insulation to produce a pH from about 8.0 to about 12.0 in water in the insulation.

DESCRIPTION OF PREFERRED EMBODIMENTS

The numbers used in the Figures are used throughout to refer to the same or similar components.

According to the present invention the principle of increasing the pH of the water in wet insulation to mitigate corrosion under insulation can be applied to existing pipelines even though it is not possible to incorporate the requisite alkaline corrosion inhibitor directly into the foam matrix. Rather than introducing the inhibitor as a finely divided powder uniformly dispersed throughout the foam matrix, the alkaline inhibitor (base) can be introduced as charges (spikes, slugs of gelatinous alkaline material and the like) of highly concentrated inhibitor. The concentrated charges may be inserted through holes in the metal jacketing into the wet (or dry) insulation. The hydroxyl ions generated by each concentrated charge of alkaline material diffuse through the wet foam, following the water path and increasing the pH. Because the hydroxyl ions are very small, they move quickly through the wet foam. Whereas it can take several years for water to migrate through a few inches of closed cell foam, the hydroxyl ions only take a few days or weeks as has been demonstrated in laboratory tests. This allows a single concentrated charge to have a relatively large radius of influence, providing protection against corrosion under insulation to a relatively large region of pipe surface.

The inhibitor spikes are formed by mixing the inhibitor (an alkaline compound) with a binding agent such as a porous water insoluble or preferably a water-soluble binding agent such as polyvinyl alcohol or polyethylene oxide and then compressing the mixture in a mold. Fibrous material (glass fibers) may be incorporated into the mixture to increase the mechanical strength of the spikes to reduce breakage during handling. The result is a solid, plastic-like spike of inhibitor which is easily and safely handled. The spikes can be molded in any size and shape desired, including having a point on one end.

Selection of the alkaline compound (base) used as the inhibitor is critical. Any alkaline compound (base) that will raise the pH of the water will retard the corrosion (oxidation) reaction. However, at very high levels of pH and especially in combination with certain alkaline compounds, some steels are susceptible to another form of corrosion: stress cracking corrosion. If care is not taken in the selection of the alkaline compound, stress cracking corrosion will be substituted for oxidation corrosion. It is known that certain alkaline compounds such as sodium hydroxide are particularly prone to causing stress cracking corrosion in steels and less desirable as the inhibitor. Buffered compounds (compounds that have a limit to their increase in pH regardless of their concentration) are a good choice. Tri-based sodium phosphate (TBSP) is an example of such a buffered compound and appears to be a good inhibitor in laboratory tests.

To allow the spikes to be inserted into the insulation on existing pipelines, holes must be provided through the metal jacketing. The requisite holes could be drilled; however, it may be more efficient to simply punch a hole through the jacketing. An electric or pneumatic device could be used to do this task quickly and safely. The inhibitor spikes would then be inserted into the insulation in a separate operation. Alternatively, a device could be developed that would both punch a hole and insert a spike in a single operation. Such a device would resemble a large version of a pneumatic nail gun commonly used in house construction.

The holes in the metal jacketing through which the inhibitor spikes are inserted can be left open, especially if located on the bottom of the metal jacketing but it is preferable to seal the holes to minimize further ingress of water and eliminate the possibility of any partially dissolved inhibitor spikes falling onto the ground. Accordingly the holes may be covered with tape (especially a metal foil tape) or by filling them with caulk, sealant, or mechanical plugs. Because the sealed holes are not subjected to the relative mechanical movement due to differential thermal expansion and/or wind-induced vibration that led to the initial failure of the seals between the shop-applied and field-applied jacketing, a reasonable lifetime for the plugs may be expected.

If a mechanical plug is used, the plug could be in the form of a cap on the end of the inhibitor spike such that when the spike was inserted into the insulation, the cap automatically plugged the hole. The cap could be tapered and/or barbed such that when inserted into the hole, the cap was positively captured, ensuring the inhibitor spike remained securely in the insulation. This feature could be incorporated as part of the one-step "nail gun" installation method. Such mechanical variations are well known to those skilled in the art.

By raising the pH of the water in the insulation, each spike provides inhibition over a given region of the pipe's surface around the spike. There is a trade-off. The larger the region of inhibition per spike, the fewer the number of spikes needed to protect an area of pipe and the fewer the number of holes that need to be punched in the jacketing. However, the larger the region of inhibition, the larger the spike needs to be. At a minimum, the spike must contain enough alkaline compound to raise the pH of the water in the region of inhibition to the desired pH level. Also, the larger the region of inhibition, the longer the time for the pH to reach the desired level and thus be protected.

Multiple spikes will be required to provide protection over a surface area as large as a weld pack. Depending on the number of spikes required (depends on pipe diameter, etc.), the spikes may be inserted in a predetermined arrangement selected to maximize the coverage area with the fewest spikes, yet achieve inhibition in the shortest possible time. When installing inhibitor spikes at a weld pack, it is not necessary to ensure that spikes are inserted only into wet insulation. Due to the low cost of the spikes and the ease of installation, it will be more cost effective to simply install the spikes in a predetermined pattern at a wet weld pack. If the weld pack is not so wet all the spikes end up in wet insulation, the ones installed into dry insulation do no harm, and they are there, ready and waiting. This is likely to be much more cost effective than trying to determine the extent of the water in the wet insulation and inserting spikes in only wet insulation.

Although the inhibitor spikes were initially developed for use in existing construction, they are highly applicable to new construction too. When used in new construction weld pack, inhibitor spikes are installed in a different manner than described above. When used in existing construction, weld packs the spikes are inserted into the foam through holes drilled or punched in the outer metal jacketing as discussed above. However, when used in new construction, there is no need to punch holes in the metal jacketing. The spikes are inserted only about half way into the shop applied foam so that a portion of each spike protrudes. Then the weld pack is installed in the current manner. When completed, inhibitor spikes are positioned across the interface between shop-applied and field-applied foam (the primary water entry path). When the weld pack begins to leak some years hence, invading water will encounter the inhibitor spikes prior to contacting the bare carbon steel pipe. Thus, when the water does eventually contact the pipe, it will have been rendered non-corrosive.

The spikes offer advantages over the previously proposed method of incorporating the inhibitor directly into the matrix of the foam. The spikes in no way change the current method of insulating pipe. This includes not having to mix powdered inhibitor into the liquid foam precursors (a step which has a high potential for exposing personnel to health hazards). Furthermore, the spike technique is considerably less expensive than incorporating powdered inhibitor directly into the foam. When spikes are used, inhibitor is placed only where it will be needed. Thus, a much smaller quantity of inhibitor is needed. Thus corrosion under insulation may be mitigated for even lower cost.

In FIG. 1, a prior art weld pack is shown. The weld pack is placed over the junction between two sections of insulated pipe. The pipe sections 10 and 10' are coated respectively with shop applied insulation 12 and 12' which are covered with outer metal sheathing 14 and 14'. This metal sheathing, as shown, typically includes corrugations 16 with the shop applied insulation and outer metal sheathing being positioned to extend along most of the length of the pipe sections but leaving uninsulated lengths 28 and 28' available at the ends of the pipe sections for a weld 18. The two sections are welded together at the weld 18. A joint jacketing 20 is then positioned to cover the uninsulated lengths 28 and 28' and a field installed insulation 22 is then injected into the joint jacketing 20 to fill the space between the inside of the joint jacketing, the outside of the uninsulated lengths 28 and 28' and the ends of the shop applied foam insulation 12 and 12'. Desirably, a sealant not shown is used to complete a seal between joint jacketing 20 and the outside of outer metal sheathing 14.

The areas of most frequent corrosion as a result of leakage of water into the weld pack is in zone 26. This has been observed to be the most frequent area of corrosion in weld packs. In other instances, water may be found in the shop applied insulation along the shop insulated lengths of pipe sections 10.

Figure 2:
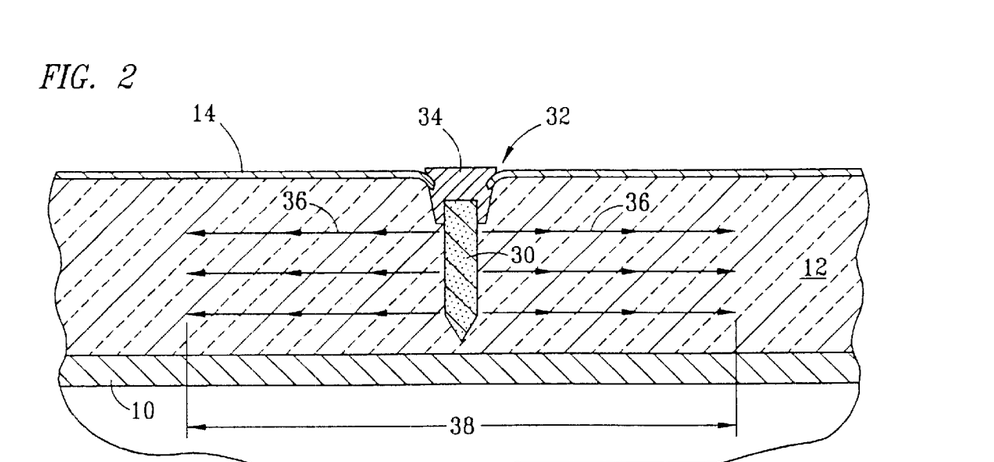
FIG. 2 is a schematic diagram of an insulated pipeline section covered with insulation which is then covered with a metallic coating and includes an inhibitor spike inserted in the insulation according to the present invention.

Along lengths of pipe 10, away from weld packs as shown in FIG. 1, spikes can be injected into insulation 12 as shown in FIG. 2. As shown, a spike 30 is injected into insulation 12 via an opening 32 in the outer metal sheathing 14 which is plugged by a plug 34. As shown, the plug is adapted to be engaged by the edges of opening 32 to retain it in position. Alternatively, spike 30 could be injected into insulation 32 with no plug being positioned in opening 32. Especially if opening 32 is on the bottom of an insulated pipeline, it may not be necessary to plug opening 32. Alternatively, opening 32 could be plugged by an adhesive or caulking material or the like. The spike could be injected by drilling opening 32, by the use of a spike injection device or the like as known to those skilled in the art. The spike is desirably formed of an alkaline material and a binder which may then be molded or otherwise formed into a solid particle for positioning in insulation 12. The spike when positioned in insulation 12 does little to affect insulation 12 unless water is present in insulation 12. If water is present, hydroxyl ions migrate as shown by arrows 36 outwardly from spike 30 into foam 12. As discussed previously, these hydroxyl ions migrate relatively rapidly into a wide area of foam insulation 12. If fewer spikes are used, it requires a longer period of time for the hydroxyl ions to migrate a sufficient distance from spike 30 to protect wide areas of pipe 10.

A typical area protected is shown by the section 38 in FIG. 2. It will be readily appreciated that the particular pipeline environment may radically affect the distance of the protection from a given spike. Alternatively, the concentrated charge of material shown as a spike in FIG. 2 could be of a different configuration and could be injected by any suitable means known to those skilled in the art.

Figure 3:
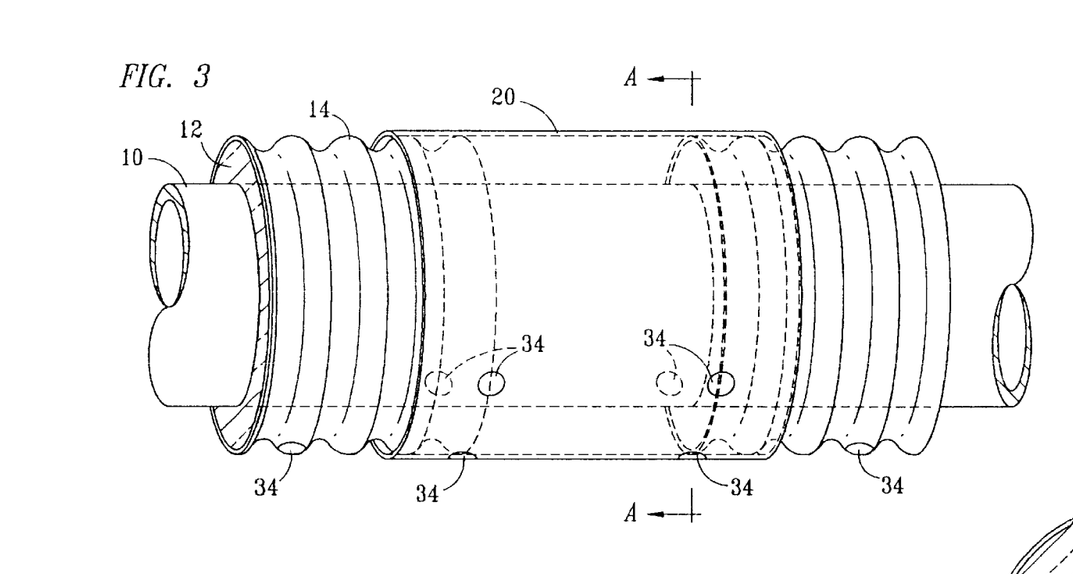
FIG. 3 is a schematic diagram of a weld pack wherein the corrosion has been inhibited according to the method of the present invention.

In FIG. 3, a weld pack is shown. This weld pack has been protected by positioning a plurality of spikes, not shown, in the lower position portion of the weld pack. Plugs 34 are shown indicating the presence of holes through which spikes have been inserted.

Figure 4:
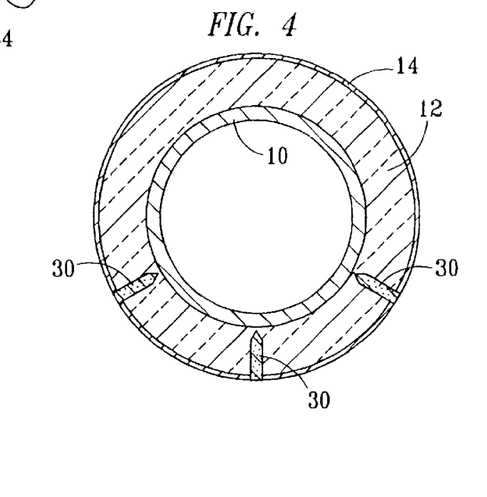
FIG. 4 is an end view of the weld pack of FIG. 3 taken at line A—A.

In FIG. 4, a cross-section of the weld pack of in FIG. 3 taken at line A—A is shown. FIG. 4 shows the presence and positioning of the spikes.

FIGS. 3 and 4 illustrate only one of many possible patterns which may be used to deploy the concentrated charges of alkaline corrosion inhibitor in the insulation.

Figure 5:
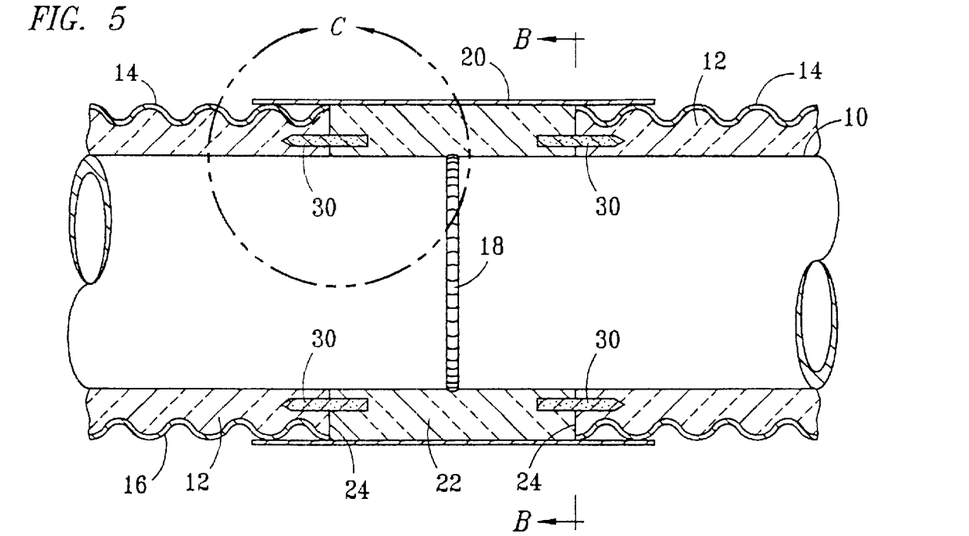
FIG. 5 is a schematic diagram of a weld pack formed according to the present invention wherein spikes including alkaline material are positioned to inhibit corrosion in both the pre-installed and in the field installed insulation.

In FIG. 5, a method for installing a new weld pack using spikes according to the present invention is shown. In this embodiment, spikes 30 are pushed into the ends of insulation 12 in pipe sections which are joined by the weld pack. The spikes are pushed only part way into the shop applied insulation so that when the joint jacketing 20 is positioned over the space between the insulation on each of the two types, the field installed insulation will be positioned around ends of spikes 30. These spikes are then embedded in both the field installed and the shop installed insulation. As a result, they are at the joints between the field installed and the shop installed insulation and ideally positioned to intercept water as it enters the weld pack and to inhibit corrosion.

Figure 6:
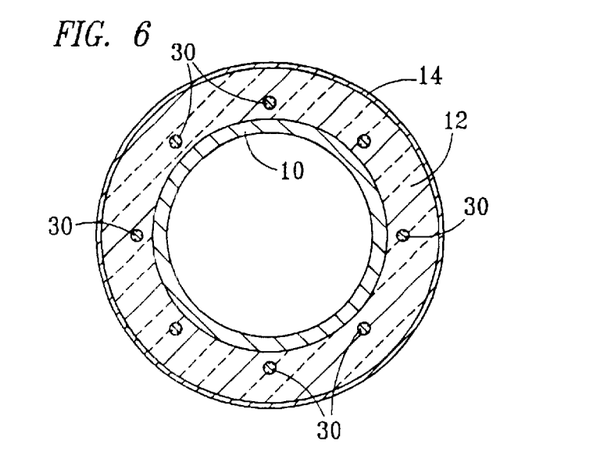
FIG. 6 is an end view of the weld pack shown in FIG. 5 taken at line B—B.

In FIG. 6, the positioning of the spikes in the embodiment of FIG. 5 is shown at line B—B.

Figure 7:
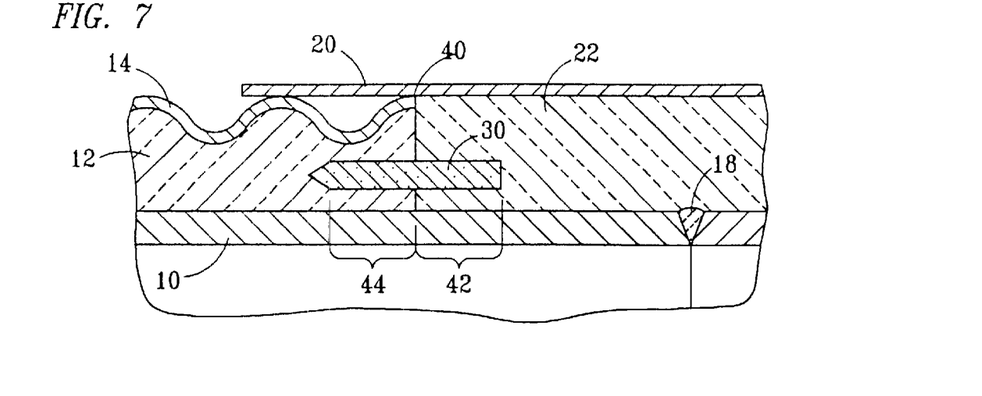
FIG. 7 is an enlarged view of the section shown by the circle C in FIG. 5.

FIG. 7 shows an enlarged view of one of the spikes 30 in position (enlargement of area in circle C).

Figure 8:
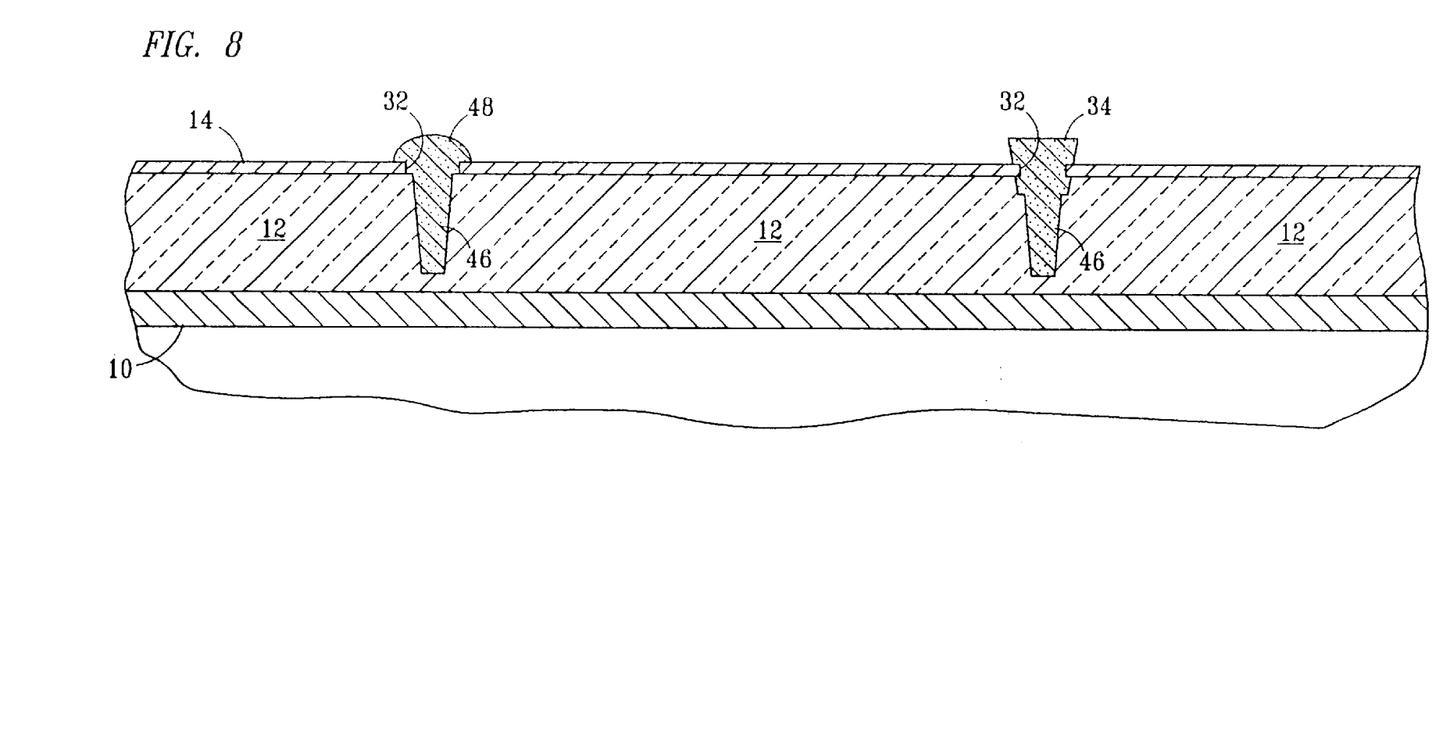
FIG. 8 shows a section of an insulated pipeline including inserted slugs of gelatinous alkaline material.

In FIG. 8, an embodiment is shown wherein a gelatinous slug of alkaline material has been injected. In FIG. 8, the gelatinous alkaline material is injected as shown at 46. As a cap 48 may be formed of the gelatinous material to plug and extend above the surface of outer metal sheathing 14 at opening 32 so that opening 32 is plugged and covered. Alternatively, as also shown in FIG. 8, a plug 34 may be used to cover the gelatinous alkaline slug 46 in place. Many variations are possible within the scope of the present invention with respect to the particular methods for injecting both the solid spikes or other configurations of solid alkaline materials into the insulation and for injecting gelatinous alkaline slugs into the insulation. For instance, the alkaline gelatin slugs could be injected by a device similar to a caulking gun which would permit the complete sealing of the openings 32, which may be drilled, punched or otherwise formed. Many such variations are possible within the scope of the present invention and will be obvious to those skilled in the art.

According to the present invention, the alkaline material is mixed with a porous water-insoluble or a water-soluble binder which may then be formed into spikes or other configurations as desired. Additionally, buffers as known to those skilled in the art, may be formed with the alkaline material and binder into the spike.

Similarly, alkaline materials and buffering materials may be combined with a gelatinous material to form a gelatin slug which may be positioned in the insulation. It is desirable that the gelatinous material be water soluble so that the alkaline material and the buffer, if used, is readily released into water in the insulation. In all instances, if the insulation is dry, the alkaline material will not be removed from either the solid spikes or from the gelatinous alkaline slugs since there will be no water to dissolve the material. Of course, if no water is present in the insulation, then corrosion under the insulation is not a problem.

Desirably, the alkaline material is present in a quantity sufficient to produce a pH from about 8 to about 12 in water in the insulation. Desirably, the pH is about 9.5 when carbon steel is used as the pipe material.

In many instances, the alkaline material will be dissolved and dispersed into the insulation in an amount from about 0.001 molar to about 1.0 molar based upon the moles of the alkaline material in one liter of water-saturated insulation material.

Some suitable alkaline materials are sodium hydroxide, potassium hydroxide, sodium carbonate, ammonium hydroxide, lithium hydroxide, lithium hydroxide hydrate, sodium sulfide, mono-hydrate, tribasic sodium orthophosphate, dibasic sodium phosphate, sodium metasilicate, potassium orthophosphate, potassium sulfide monopenta-hydrate, and mixtures thereof. A particularly preferred alkaline material is tribasic sodium orthophosphate.

As noted previously, buffering compounds as known to those skilled in the art, may be used with certain of the alkaline materials as required to control the pH within the desired limits. Such buffering materials are well known to those skilled in the art and need not be discussed in detail. It is, however, desirable that the pH be no higher than about 12 because of concerns about damage to the pipe by reason of stress corrosion cracking. Similarly, pH values below about 8 are less effective in inhibiting corrosion.

As indicated previously, the fabrication and use of such pipelines is well known. Similarly, various methods for installing the weld packs are well known and various methods for producing and inserting the slugs of alkaline material into the insulation either as solid spikes, solid particles of different configurations, or as gelatinous slugs are well known to those skilled in the art.

By the method of the present invention, alkaline compounds can be inserted into existing insulation on existing pipelines, thereby inhibiting corrosion on those pipelines at a minuscule fraction of the cost of replacing the insulation or even of checking the insulation. Since the spikes are relatively inexpensive, a large number of spikes can be used to minimize corrosion in existing pipelines. Further, new weld packs can be inhibited with respect to under-insulation corrosion by the installation of spikes as discussed above.

The method of the present invention may be used to produce corrosion inhibited pipelines comprising a pipeline having insulation positioned around at least a major portion of the pipeline and a plurality of concentrated charges of alkaline material which is at least partially soluble in water in the insulation to produce a pH from about 8 to about 12 in the water in the insulation. The pipeline also desirably includes a cover around the outside of the insulation. The present invention as discussed previously, also contemplates a method wherein weld pack structures may be protected by the use of the insertion of spikes in new construction.

Having thus described the present invention by reference to certain of its preferred embodiments, it is respectfully pointed out that the embodiments described are illustrative rather than limiting in nature and that many variations and modifications are possible within the scope of the present invention. Many such variations and modifications may appear obvious and desirable to those skilled in the art based upon a review of the foregoing description of preferred embodiments.

Having thus described the invention, we claim:

1. A method for inhibiting corrosion under insulation on the exterior of a structure by inserting a concentrated charge of an alkaline material into the insulation at a selected location, the alkaline material being at least partially soluble in water in the insulation to produce a pH from about 8.0 to about 12.0 in water in the insulation.

2. The method of claim 1 wherein a plurality of concentrated charges are inserted into the insulation at a plurality of selected locations.

3. The method of claim 1 wherein the alkaline material is selected from the group consisting of sodium hydroxide, potassium hydroxide, sodium carbonate, ammonium hydroxide, lithium hydroxide, lithium hydroxide hydrate, sodium sulfide, mono-hydrate, tribasic sodium orthophosphate, dibasic sodium phosphate, sodium metasilicate, potassium orthophosphate, potassium sulfide monopentahydrate, and mixtures thereof.

4. The method of claim 1 wherein the alkaline material is tribasic sodium orthophosphate.

5. The method of claim 1 wherein a buffer material is included in or inserted with the concentrated charge to maintain the pH in the range from about 8 to about 12.

6. The method of claim 1 wherein the structure is a pipeline, wherein the insulation is a foam insulation positioned around the pipeline and wherein the concentrated charge is inserted as a solid spike which is inserted into the foam insulation to position the concentrated charge of an alkaline material in the insulation.

7. The method of claim 6 wherein a cover is positioned over the outside of the insulation and wherein the spike is inserted through the cover into the insulation.

8. The method of claim 1 wherein a plurality of concentrated charges are inserted at a plurality of selected locations.

9. The method of claim 1 wherein the insulating material is selected from the group consisting of foam insulation, closed cell foam insulation and fibrous insulation.

10. The method of claim 1 wherein the foam insulation material is a polyurethane foam.

11. The method of claim 1 wherein the concentrated charge comprises a solid member comprising a binding agent and the alkaline material.

12. The method of claim 11 wherein the binding agent is a water soluble binding agent selected from the group consisting of polyvinyl alcohol and polyethylene oxide.

13. The method of claim 12 wherein the solid member further comprises a fibrous material.

14. The method of claim 1 wherein the structure comprises a weld pack.

15. The pipeline of claim 1 wherein the concentrated charge is inserted as a spike, wherein the structure is a pipeline, wherein a cover is positioned over the insulation and wherein the spike is inserted into the insulation through an opening in the cover.

16. The method of claim 15 wherein the opening in the cover is plugged after insertion of the spike.

17. The method of claim 1 wherein the structure is a weld pack at the junction of two pipe sections, the pipe sections being coated with insulation, the insulation being positioned around an outside of the pipe and including a cover around the pipe outside the insulation with an end portion of each pipe section extending outside the insulation with the ends of the end portions of two pipe sections being welded together with a jacketing being positioned to cover the uninsulated end portions with a field installed insulation being positioned in the space outside the end portions between the insulation on the pipe sections and inside the jacketing and wherein a concentrated charge is inserted into a least one of the insulation on each pipe section and into the field installed insulation.

18. The method of claim 1 wherein the concentrated charge is injected as a slug of gelled alkaline material.

19. The method of claim 1 wherein the slug comprises a water soluble gelling agent and the alkaline material.

20. A corrosion inhibited pipeline comprising:
a) a pipeline;
b) insulation positioned around at least a major portion of the pipeline; and,
c) a plurality of slugs of an alkaline material which is at least partially soluble in water in the insulation to produce a pH from about 8.0 to about 12.0 in the water in the insulation.

21. The pipeline of claim 20 wherein the pipeline includes a cover positioned around the outside of the insulation.

22. The pipeline of claim 21 wherein the concentrate charge comprises a gelatinous slug which is inserted through an opening in the cover into the insulation.

23. The pipeline of claim 22 wherein the opening in the cover is plugged.

24. A method for inhibiting corrosion in a weld pack at the junction of two pipe sections, each of the pipe sections being coated with insulation, the insulation being positioned around the pipe sections and between an outside of the pipe and an inside of a cover positioned over an outside of the insulation with end portions of the pipe being uninsulated and welded together to join the two pipe sections; the method comprising:
a) positioning a plurality of slugs containing an alkaline material at least partially soluble in water in the insulation to produce a pH from about 8 to about 12 in the water in the insulation;
b) covering the end portions of the pipe with a jacketing and positioning a field installed insulation inside the jacketing to fill the spacer between ends of the insulation, and between the outside of the end portions of the pipe and an inside of the jacketing.

25. The method of claim 24, wherein the concentrated charges are positioned in the insulation prior to positioning the field installed insulation so that ends of the concentrated charges extend from the ends of the insulation and into the space to be filled with the field installed insulation.

26. A method for inhibiting corrosion under a foam insulation positioned around an exterior of a pipeline by inserting a concentrated charge of an alkaline material into the foam insulation at a selected location, the alkaline material being at least partially soluble in water in the foam insulation to produce a pH from about 8.0 to about 12.0 in water in the foam insulation wherein the concentrated charge is inserted as a solid spike which is inserted into the foam insulation to position the concentrated charge of an alkaline material in the foam insulation.

* * * * *